(12) United States Patent
Poncet et al.

(10) Patent No.: US 10,017,279 B2
(45) Date of Patent: Jul. 10, 2018

(54) SPACE VEHICLE COMPRISING POSTS FOR FORMING A STACK, STACK COMPRISING AT LEAST TWO SUCH VEHICLES PLACED IN A LAUNCHER, AND METHOD FOR RELEASING THE VEHICLES

(71) Applicant: AIRBUS DEFENCE AND SPACE SAS, Les Mureaux (FR)

(72) Inventors: Dominique Poncet, Toulouse (FR);
Christophe Prud Hon, Toulouse (FR);
Serge Guyot, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/564,816

(22) PCT Filed: Sep. 12, 2016

(86) PCT No.: PCT/FR2016/052287
§ 371 (c)(1),
(2) Date: Oct. 6, 2017

(87) PCT Pub. No.: WO2017/046497
PCT Pub. Date: Mar. 23, 2017

(65) Prior Publication Data
US 2018/0111707 A1    Apr. 26, 2018

(30) Foreign Application Priority Data

Sep. 16, 2015 (FR) .................................. 15 58695

(51) Int. Cl.
*B64G 1/00* (2006.01)
*B64G 1/64* (2006.01)
*B64G 1/10* (2006.01)

(52) U.S. Cl.
CPC ............ *B64G 1/641* (2013.01); *B64G 1/1085* (2013.01); *B64G 1/645* (2013.01); *B64G 2001/643* (2013.01)

(58) Field of Classification Search
CPC ....... B64G 1/641; B64G 1/645; B64G 1/1085
See application file for complete search history.

(56) References Cited

U.S. PATENT DOCUMENTS

| 5,199,672 | A |   | 4/1993 | King et al. |
| 5,411,226 | A | * | 5/1995 | Jones ................... B64G 1/1085 |
|           |   |   |        | 244/173.3 |

(Continued)

FOREIGN PATENT DOCUMENTS

| EP | 1 008 516 B1 | 11/2003 |
| WO | 96/39328 A1 | 12/1996 |
| WO | 00/09396 A2 | 2/2000 |

OTHER PUBLICATIONS

International Search Report, dated Nov. 4, 2016, from corresponding PCT application No. PCT/FR2016/052287.

*Primary Examiner* — Philip J Bonzell
(74) *Attorney, Agent, or Firm* — Young & Thompson

(57) ABSTRACT

Disclosed is a space vehicle, such as a satellite, the vehicle including: at least one equipment-carrying module for carrying equipment of the vehicle; at least three posts extending at least partially in the same longitudinal direction and on the periphery of the equipment-carrying module, each post being provided with at least one releasable locking device; and a reinforcing structure which rigidly connects each post transversely to at least two other posts.

20 Claims, 9 Drawing Sheets

(56) References Cited

U.S. PATENT DOCUMENTS

| | | | |
|---|---|---|---|
| 5,522,569 A * | 6/1996 | Steffy | B64G 1/002 |
| | | | 136/245 |
| 5,605,308 A | 2/1997 | Quan et al. | |
| 5,860,624 A | 1/1999 | Obry et al. | |
| 6,138,951 A | 10/2000 | Budris et al. | |
| 6,276,639 B1 | 8/2001 | Hornung et al. | |
| 7,832,687 B1 | 11/2010 | Das et al. | |
| 8,511,617 B2 | 8/2013 | Caplin et al. | |
| 8,915,472 B2 | 12/2014 | Aston et al. | |
| 8,939,409 B2 | 1/2015 | Apland et al. | |
| 2008/0078886 A1 | 4/2008 | Foster et al. | |
| 2015/0232205 A1 | 8/2015 | Lively et al. | |

\* cited by examiner

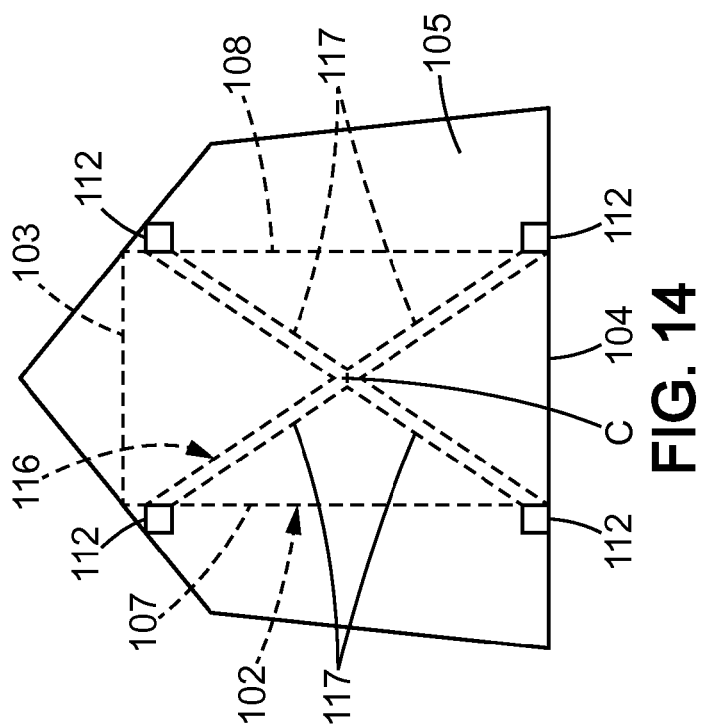
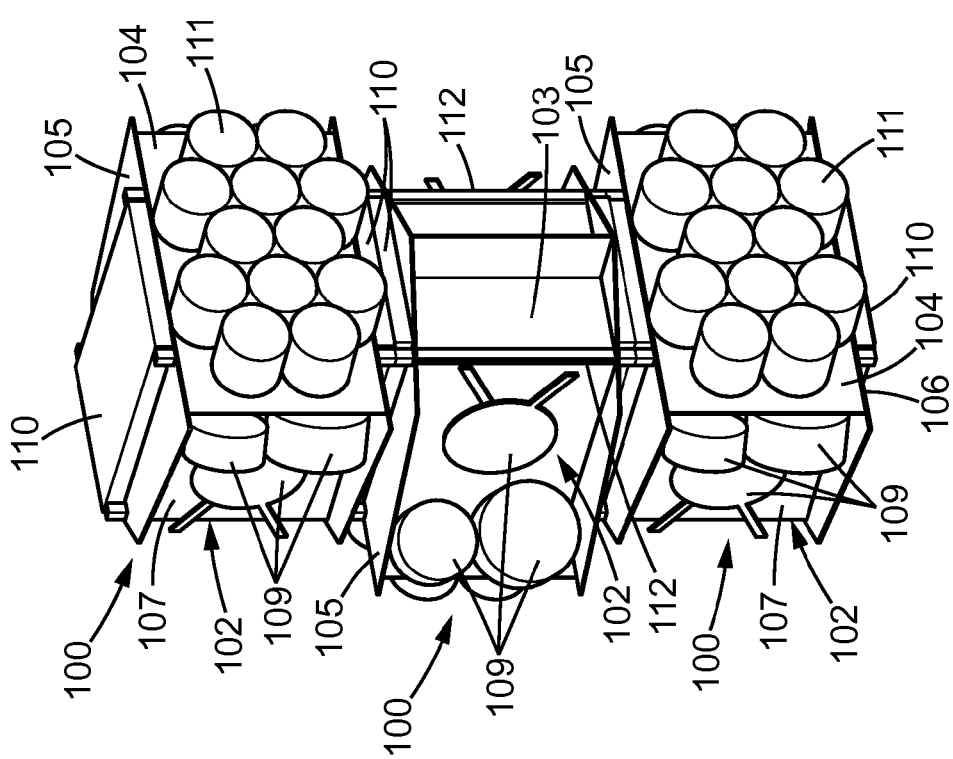

SPACE VEHICLE COMPRISING POSTS FOR FORMING A STACK, STACK COMPRISING AT LEAST TWO SUCH VEHICLES PLACED IN A LAUNCHER, AND METHOD FOR RELEASING THE VEHICLES

The invention relates to the field of spacecrafts, and more particularly but not exclusively, to the field of satellites designed to be put into orbit around the Earth.

Conventionally, a satellite is put into orbit using a launcher, which carries the spacecraft into space to drop it according to the intended orbit.

To reduce the costs of launching a satellite, it is known to place in a single launcher several satellites to be dropped in a single launch. This is referred to as a satellite cluster launch. The more satellites are launched, the more significantly costs are reduced.

A problem, when several satellites are placed in a single launcher, is managing stresses at launch. Indeed, the launch phase generates vibrations and shocks, in addition to creating a thrust due to the acceleration. Thus, a simple stack of satellites one above another produces, in particular on satellites located under one or more satellites (with respect to gravity and/or the direction of acceleration), stresses which could damage the equipment carried by this satellite.

However, the current trend is for the launch of increasingly powerful satellites, including multiple equipment and radiative walls with large surface areas to cool the equipment. Some satellites may have a weight of several tons.

It is then necessary to provide means for placing, in an adequate manner, satellites in a single launcher to minimize stresses on the satellites.

One known way is to set up a structure in the launcher known as the "dispenser". U.S. Pat. No. 8,939,409 describes an example of a dispenser. A dispenser typically comprises on the one hand members attached to the launcher and optionally on the other hand members attached to the satellites, i.e. on the one hand members to remain bound to the launcher after dropping the satellites and on the other hand members to follow the dropped satellites. Satellites are therefore supported by the dispenser acting like a shelf, and do not support each other.

However, the dispensers have the disadvantage of being specially adapted to the type of satellite to drop. Thus, the design of the dispensers depends on their use. It may also happen that several satellites with different designs have to be dropped from a single launcher, making the structure of the dispenser in the launcher more complex. Furthermore, the dispenser comprises members which are integral to the launcher. These members add weight to the launcher and are, ultimately, detrimental to the mission. The weight distribution in the launcher should also be monitored, in particular during dropping. Indeed, to maintain the balance of the launcher when launched, the satellite drop sequence must comply at all times with an adequate weight distribution within the launcher. Drop operations are therefore more complex.

Another disadvantage of a dispenser is that the shape and sizes of the satellites are limited by the space provided by the dispenser.

It is also known to directly stack the satellites on top of each other by providing, on each satellite structure, an interface dedicated for stacking, such that the satellite bodies are not in contact with each other themselves, but through the dedicated interface.

Document U.S. Pat. No. 8,915,472 shows an example of a system for attaching two satellites together. For this purpose, each satellite comprises a core structure extending over the entire length of the satellite, on which load support panels are placed. The core structure of a first satellite is connected with the core structure of a second satellite by means of a pre-tensioned release band. Stresses between the two satellites are then transmitted through their core structure.

A disadvantage of this system is that it reduces the space available for mounting equipment on the satellites. In particular, the antennas of a telecommunication satellite are placed on the Earth face of the satellite body. In U.S. Pat. No. 8,915,472, the core structure must be accessible by at least one face of the satellite body to allow contact between two core structures of two satellites without contacting other members. Said faces are then unavailable to put satellite equipment thereon, in particular antennas.

Another disadvantage is that, in an incidental manner to the aforementioned disadvantage, the satellites cannot be arranged in a way which optimizes space inside the launcher, referred to as space under the fairing. Indeed, the presence of the core structure requires a same orientation for all the stacked satellites.

U.S. Pat. No. 8,511,617 also provides stacking satellites showing a dedicated interface structure. In this document, the dedicated structure is in the form of a cylinder outside the satellite body, the cylinders then being used as a support when the satellites are stacked.

A disadvantage of this solution is that the cylinder outside the satellite also limits available space for the equipment carried by the satellite. Furthermore, again, the satellites cannot be arranged in any direction because the outer cylinder requires placing equipment in the space available between the body of the satellite and the cylinder. The space under the fairing is not yet optimized either.

Finally, both the core structure described in U.S. Pat. No. 8,915,472 and the outer cylinder described in U.S. Pat. No. 8,511,617 are relatively massive and imposing structures which increase satellite weight.

There is therefore a need for a solution for stacking several satellites in a launcher, or several spacecrafts in general, overcoming in particular the aforementioned disadvantages.

A first purpose of the invention is to provide a spacecraft which can be placed in a launcher with at least one other spacecraft without spacecraft damage being caused by transmitting stresses.

A second purpose of the invention is to provide a spacecraft which can be placed in a launcher with at least one other spacecraft which increases none or little of either total satellite weight or launcher weight.

A third purpose of the invention is to provide a spacecraft which can be placed in a launcher with at least one other spacecraft providing flexibility in the orientation of the spacecrafts placed in the launcher to optimize space under the fairing.

A fourth purpose of the invention is to provide a spacecraft which can be placed in a launcher with at least one other spacecraft providing flexibility in the shape and dimensions of each stacked spacecraft.

A fifth purpose of the invention is to provide a spacecraft which can be placed in a launcher with at least one other spacecraft wherein the interface structure between the two spacecrafts can adapt itself to equipment which may be placed on the satellites.

A sixth purpose of the invention is to provide a spacecraft which can be placed in a launcher with at least one other spacecraft in which the spacecraft can be dropped one by one or in groups.

Thus, according to a first aspect, the invention provides a spacecraft such as a satellite, intended to be put into orbit around a planet, the spacecraft comprising:
- at least one equipment carrying module, for supporting the spacecraft equipment;
- at least three posts extending at least partially in a same longitudinal direction and at the periphery of the equipment carrying module, each post being provided with at least one releasable locking device which may have two states:
  - a locked state, wherein the locking device is attached to an additional locking device,
  - an unlocked state, wherein the locking device is released from any other locking device;
- a reinforcing structure which rigidly connects each post transversely to at least two other posts.

The reinforcing structure may comprise reinforcing members in the form of legs, the number of which corresponds to at least the number of posts, each leg being attached between two posts. The legs may then be combined with the equipment carrying module walls, the walls forming a support for the spacecraft equipment.

The reinforcing structure may alternatively comprise reinforcing members in the form of legs, the number of which corresponds to at least the number of posts, each leg being attached on the one hand to a post and on the other hand to a single attachment center.

Advantageously, the reinforcing legs are connected in pairs by shear consolidating members.

According to an embodiment, there are three posts and they are distributed on the vertices of an equilateral triangle.

According to another embodiment, there are four posts and they are distributed on the vertices of a parallelogram.

Each releasable locking device may comprise for example a magnetic member or a pyrotechnic member.

Each post may advantageously be provided with two releasable locking devices, for stacking the satellite on another satellite or on an interface structure and for stacking another satellite on the satellite.

Preferably, but not necessarily, each post extends longitudinally between two ends, each end being provided with a locking device. Stacking the satellites is then performed from the post ends, in a longitudinal direction. The strains accommodated by the posts are then mainly shear strain, and the posts can be designed (shapes and sizes) for accommodating these strains.

According to a second aspect, the invention provides a method of assembling at least two spacecrafts as presented above. The method comprises the steps of:
- positioning the at least two spacecrafts such that the posts of a first spacecraft extend at least partially in the same longitudinal direction as the posts of the second spacecraft;
- cooperating each locking device of the first spacecraft with a locking device of the second spacecraft;
- switching to the locked state of the locking devices of the first spacecraft on the locking devices of the second spacecraft. According to a third aspect, the invention provides a stack of spacecrafts as set forth above, comprising at least two spacecrafts secured together, the at least one releasable locking device of each post of a first spacecraft being in locked position with a locking device on a post of the second spacecraft, the posts for each spacecraft extending in a same longitudinal direction, the stack further comprising a device for controlling the state of the locking devices.

The spacecrafts from the stack are in particular satellites comprising an Earth face and an anti-Earth face, the Earth and anti-Earth faces, which may be oriented in a longitudinal direction of the posts or in a direction transverse to the posts.

According to a fourth aspect, the invention provides a spacecraft launcher, the launcher comprising a spacecraft interface structure and at least one first stack of spacecrafts as presented above. At least the first spacecraft of the stack is a spacecraft comprising two releasable locking devices on each post, a first locking device for each post of the first spacecraft being in the locked state on a locking device of the second spacecraft, the second locking device of each post of the first spacecraft being in the locked state on the spacecraft interface structure.

According to a fifth aspect, the invention provides a method for dropping spacecrafts by means of a launcher as presented above, comprising a step of separation between a spacecraft to drop and a spacecraft intended to remain in the launcher by putting into the unlocked state the locking devices between the two spacecrafts so as to release a single spacecraft. Alternatively or in combination, the dropping method comprises a step of separating a group of spacecrafts to drop and one spacecraft intended to remain in the launcher by putting into the unlocked state the locking devices between a spacecraft from the group to drop and the spacecrafts intended to remain in the launcher, in order to drop the group of spacecrafts.

Other features and advantages of the invention will appear in the light of the following description of specific embodiments accompanied by the figures in which:
- FIG. 1 is a three-dimensional schematic view of a first example of a satellite, comprising a body on which equipment is placed, solar panels being represented in deployed position in solid lines and in folded position in dashed lines;
- FIG. 2 is a three-dimensional view of the satellite in FIG. 1, the body being transparent;
- FIG. 3 is a plan view of the satellite in FIG. 2;
- FIG. 4 is a plan view schematic representation of posts of the satellite in FIGS. 1 to 3 and a reinforcing structure according to a first embodiment;
- FIG. 5 is a three-dimensional view of the posts and the reinforcing structure in FIG. 4;
- FIG. 6 is a plan view schematic representation of posts of the satellite in FIGS. 1 to 3 and a reinforcing structure according to a second embodiment;
- FIG. 7 is a three-dimensional view of the posts and the reinforcing structure in FIG. 6;
- FIG. 8 is a three-dimensional view of an embodiment of a stack of satellites in FIGS. 1 to 3;
- FIG. 9 is a side view of the stack in FIG. 8;
- FIG. 10 is a three-dimensional view of a stack of satellites in FIGS. 1 to 3 placed in a launcher, the latter being shown in transparence;
- FIG. 11 is a plan view of the launcher in FIG. 10;
- FIG. 12 is a schematic representation of an embodiment of two releasable locking devices placed at the ends of two posts located opposite one another;
- FIG. 13 is a three-dimensional view of another embodiment of a stack of a second example of a satellite;
- FIG. 14 is a plan view schematic representation of a satellite from the stack in FIG. 13;
- FIG. 15 is a representation of the stack in FIG. 13 placed in a launcher;

The term "spacecraft" here refers to any member comprising an equipment-carrying module likely to transport equipment. It may be provided with propulsion means of its own, or be designed to simply be dropped in a point in space in the wait to be picked up by other space means.

Figure 1:
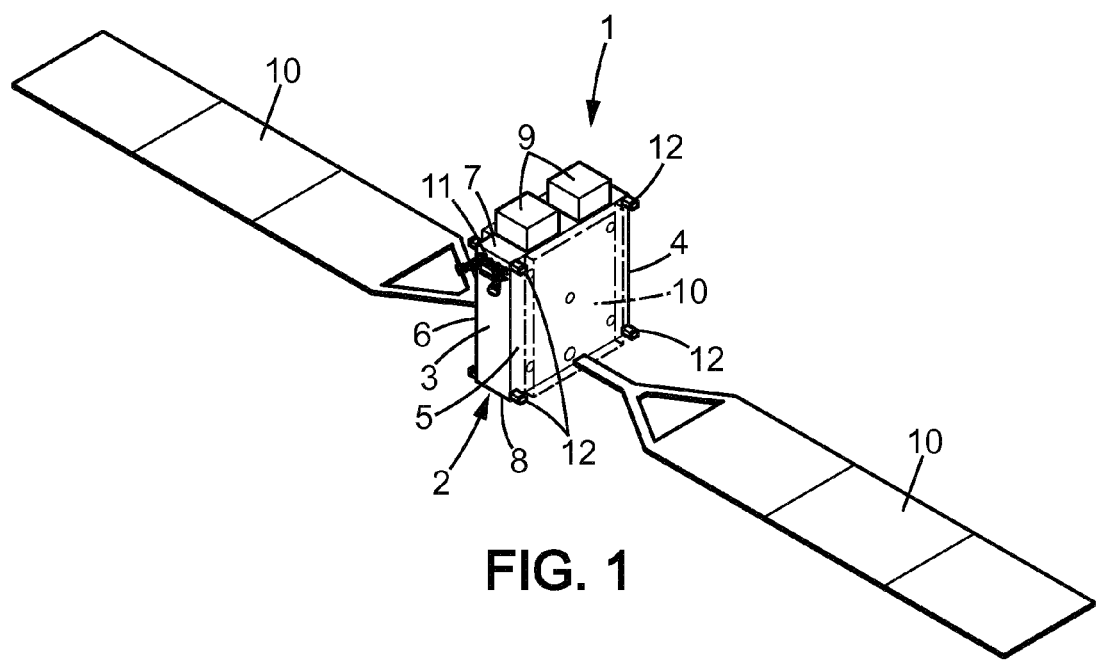
FIGS. 1 to 11 show a first example of a spacecraft, and in particular an example of a telecommunication satellite 1, intended to be put into orbit around the Earth.

The equipment-carrying module of the satellite 1 is commonly referred to as satellite 1 body 2, and has a parallelepiped overall shape, so as to have four faces referred to as West face 3, East face 4, North face 5, South face 6, with reference to terrestrial cardinal points, and two faces referred to as Earth face 7 and anti-Earth face 8, with reference to the orientation of these faces relative to the Earth. One or more antennas 9, shown in schematic representations in the figures, are commonly placed on the Earth face 7 to be oriented towards the Earth. The satellite 1 is equipped with various equipment depending on its mission. Typically, the satellite 1 may comprise solar panels 10 mounted on the North 5 and South 6 faces to receive maximum sunlight. In FIG. 1, the solar panels 10 are illustrated in solid lines in their deployed position. In dashed lines, the solar panel 10 mounted on the North face 5 is shown in its folded position against this face. The satellite 1 can also board thrusters to correct the trajectory of the satellite 1 in orbit. Pointing the satellite in the desired direction is generally done using optical sensors 11, such as star sensors.

Figure 3:
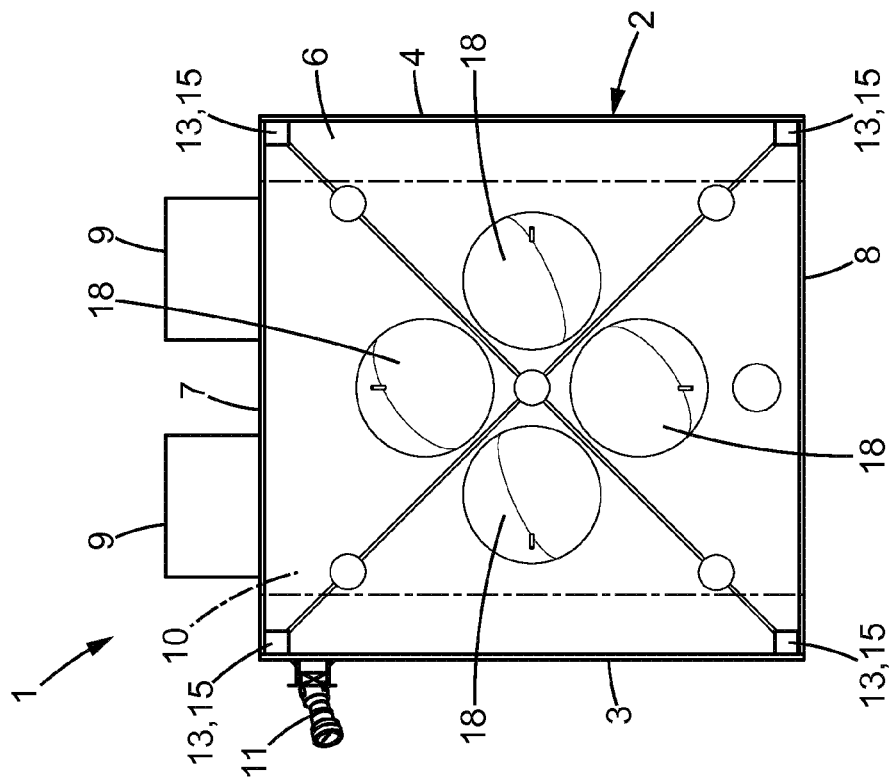
Figure 2:
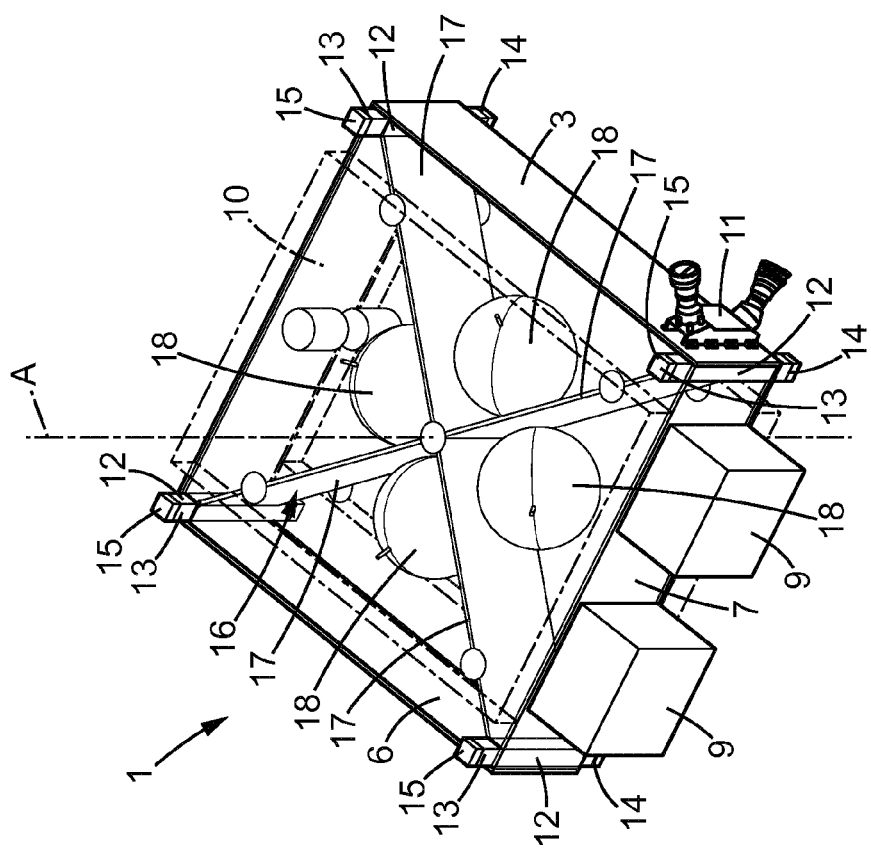
Figure 4:
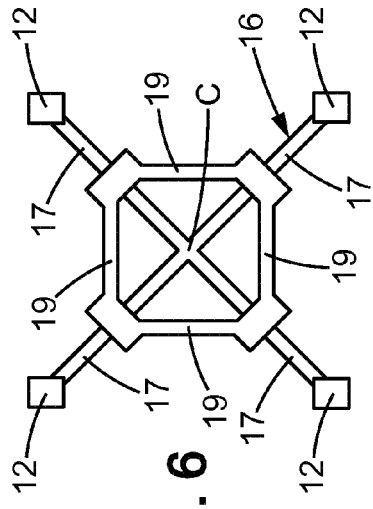
Figure 5:
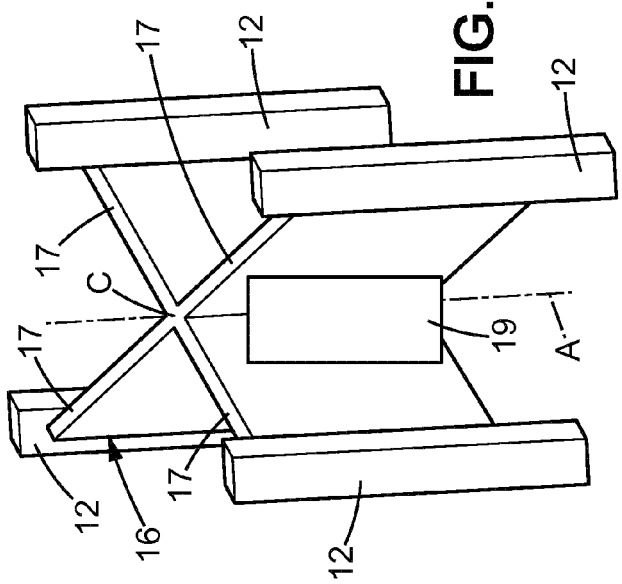
Figure 6:
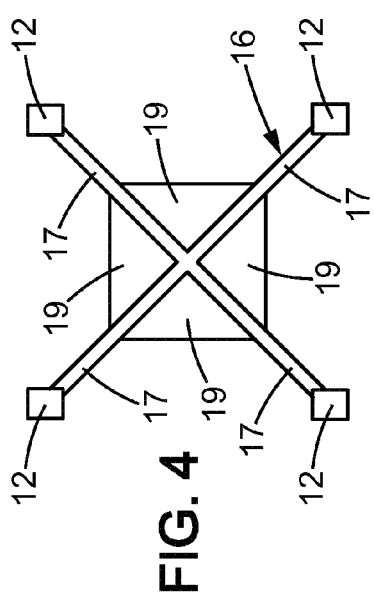
Figure 7:
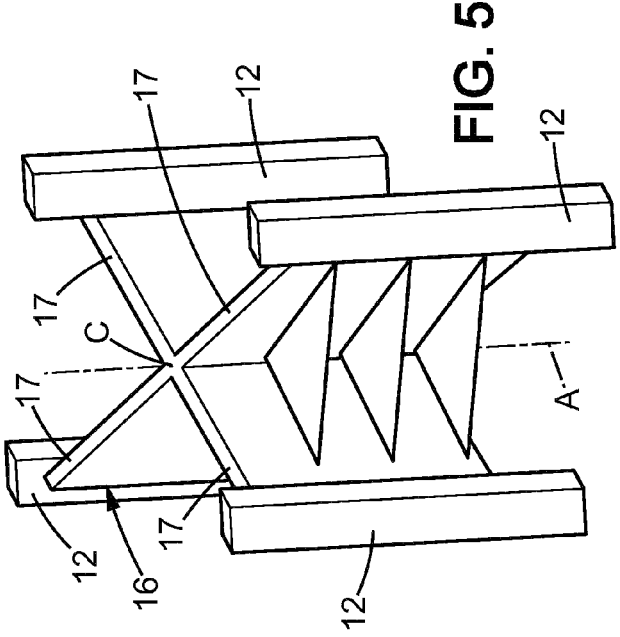

In FIGS. 2 and 3, the solar panel 10 mounted on the South face 6 is shown in its folded position against the face 6, and the solar panel 10 and the South face 6 are shown in dashed lines to show the structure of the satellite body 2, here shown as a schematic representation. It can then be seen that the satellite 1 comprises posts 12, extending in a same longitudinal direction A, perpendicular to the North and South faces according to the example presented.

In the following, the terms "longitudinal", "longitudinally" and variations thereof refer to what is parallel to the longitudinal direction A. The terms "transverse", "transversally" and variations thereof then refer to what is perpendicular to the longitudinal direction A.

The number of posts 12 is at least equal to three, and is preferably equal to four in the case of the parallelepiped body 2. The posts 12 are not aligned and are arranged for example on the vertices of a triangle in the case of three posts, or on the vertices of a quadrilateral in the case of four posts 12.

The posts 12 are placed at the periphery of the body 2, i.e. they are located at a distance from a geometrical center C of the body 2.

The posts 12 may be placed at the inner periphery of the body 2, as illustrated in FIGS. 1 to 11, i.e. the walls holding the faces 3 to 8 of the satellite 1 body 2 surround and extend between the posts 12. In other words, the posts 12 materialize the actual contour of the body 2.

Alternatively, the posts 12 may be placed at the outer periphery of the body 2, i.e. the posts define a virtual contour of the body 2, the walls holding the faces 3 to 8 of the satellite 1 body 2 extending inside this virtual contour, The geometric center C of the body 2 is for example the barycenter of the body 2. The four posts 12 are preferably arranged equidistant from the geometric center C, on the vertices of a rectangle or a square, depending on the dimensions of the North and South faces 5, 6.

Thus, as shown in FIGS. 2 and 3, the body 2 walls materializing the faces 3, 4—West, East—and 7, 8—Earth, anti-Earth—of the satellite 1 are each attached between two posts 12. The volume defined by the satellite body 2 therefore does not extend beyond the posts 12.

Each post 12 comprises two ends, namely a so-called distal end 13 and a so-called proximal end 14, the "distal" and "proximal" adjectives here being used with reference to the distance from an interface structure of a spacecraft launcher, as will be explained later, a proximal end 14 being closer to the spacecraft interface structure than a distal end 13. The distal ends 13 of the posts 12 of the satellite 1 are preferably in a single transverse plane. Similarly, the proximal ends 14 of the posts 12 are also located in a single transverse plane. However, nothing prevents all posts 12 of a satellite 1 from having different sizes to adapt to the satellite 1 configuration. At least one of the ends 13, 14 is provided with a releasable locking device 15. In practice, each end 13, 14 of the posts 12 of the satellite 1 is provided with a releasable locking device 15.

The posts 12 are designed to allow stacking of at least two satellites 1 one over the other, such that the transmission of stresses between two stacked satellites 1 passes predominantly, and preferably exclusively, through the posts 12. Thus, advantageously, the longitudinal dimension of the posts 12 is greater than that of the body 2, and even more preferably, is greater than that of the body 2 taking into account the equipment such as the solar panels 10 when folded. More specifically, and according to the example shown, the distal end 13 and proximal end 14 meet at least at the same level as the folded solar panels 10, and may extend beyond.

For this purpose, each locking device 15 of each satellite 1 may have two states:

a locked state, wherein the locking device 15 is attached on another complementary locking device, for example a locking device 15 for another satellite 1, such that both satellites 1 are secured together;

an unlocked state in which the locking device 15 is released from any other locking device, such that the satellite 1 is physically independent of any other satellite 1.

Two satellites 1 are thus stacked by placing their respective posts 12 opposite and above each other and according to a same longitudinal direction A, for example by bringing the distal end 13 of the posts 12 of a first satellite 1 together with the proximal end 14 of the posts 12 of a second satellite. The locking devices 15 of the first satellite are then cooperated with the locking devices 15 of the second satellite, and each locking device 15 is put into the locked state. The two satellites 1 are then secured together.

As will be explained later, each stack of satellites comprises a control device for the locking devices 15 of the satellites 1 of the stack to separate the satellites in order to drop them in space.

The posts 12 are distributed at the periphery of the body 2 so as to ensure a better recovery of stresses between the satellites 1, while taking account of the congestion in the environment of the satellite 1 body 2. Indeed, the farther away the posts 12 are from the center C of geometry of the body 2, and thus one from the other, the greater is the stability of the stack of two satellites 1, and the lower are the shear strains on the stacked posts 12. The distance between the posts 12 and the desired geometry center C is thus as large as possible given the space both around the satellite body 2 and in the launcher. Consequently, this minimizes the amount of material required for the posts while maximizing the mechanical strength of the satellite.

Such an arrangement of posts 12 also allows on the one hand to maximize the space available for accommodating the satellite 1 and on the other hand to minimize the global space requirement of a satellite stack under the launcher fairing by allowing satellites on the top or the bottom to partially extend inside the satellite 1. In order to limit shear deformation of the posts 12 when the stacked satellites are subjected to stresses, each satellite 1 further comprises a reinforcing structure 16 rigidly connecting each post 12 of the satellite 1 transversely to at least two other posts 12 of the satellite 1.

The reinforcing structure 16 comprises reinforcing members in the form of legs 17 which connect the posts 12 one another. The number of legs 17 is then equal to the number of posts 12. According to the example in FIGS. 2 and 3, there are four legs 17 and they are arranged along the diagonals of the square or rectangle formed by the posts 12. More specifically, each leg 17 is rigidly attached on the one hand to a post 12 and on the other hand to a single attachment center of the body 2, which is combined, in the example presented here, with the geometric center C of the body 2. Each leg 17 of the reinforcing structure 16 may have a longitudinal dimension substantially equal to the longitudinal dimension of the post 12 on which it is attached.

Thus, the legs 17 of the reinforcing structure 16 rigidify the posts 12 subjected to stresses which tend to deform them transversely, and in particular to shear deformations.

The legs 17 of the reinforcing structure 16, forming a lattice inside the body 2, increase the space requirement inside the satellite 1 body 2 insignificantly. Indeed, the thickness of the legs 17, i.e, their size in the transverse plane, can be adapted to accommodate the space inside the body 2. For example, as shown in FIGS. 2 and 3, the space inside the body 1 remains available for placing four tanks 18, the pairs of legs 17 defining a compartment.

Alternatively, the reinforcing structure 16 may be formed by body 2 walls, in the case of the example shown, the walls materializing the faces 3, 4—West, East—and 7, 8—Earth, anti-Earth—of the satellite 1, which, being attached to the posts 12 and connected in pairs, also provide rigidity. In this case, the reinforcing structure 16 does not increase at all the space requirement of the satellite 1 body 2.

The reinforcing structure 16 may further include shear consolidating members 19, to further increase post rigidity facing shear stress, and connecting the legs 17 in pairs.

The posts 12, legs 17, and shear consolidating members 19 are dimensioned according to the dimensions and weight of the satellite 1, as well as stress expected in the launcher. In particular, the posts 12 may be hollow and used for passing conduits or cables for the satellite 1 equipment, but may also be filled to accommodate high strain. The section of the posts 12 may also be a circular, rectangular, T-shaped etc. cross-section depending on the strains to accommodate. The shape of the cross-section may vary along its length. Their material may be of any type such as for example: aluminum, titanium, composite, or another material.

FIGS. 4 to 7 are schematic representations of the four posts 12, arranged on the vertices of a square, connected by legs 17 as presented above, and shear consolidating members 19 according to two embodiments. According to a first embodiment (FIGS. 4 and 5), the consolidating members 19 are arranged transversely between two legs 17. For example, the consolidating members 19 are in the form of a longitudinal succession of triangular plates extending in the compartment formed between two adjacent legs 17. According to a second embodiment (FIGS. 6 and 7), the consolidating members 19 are arranged longitudinally between two adjacent legs 17, and are in the form of a rectangular plate. In this case, the body 2 walls materializing the faces 3, 4—West, East—and 7, 8—Earth, anti-Earth—of the satellite 1 can act as shear consolidating members 19.

The structure of the satellite in the description allows stacking satellites 1 in a launcher 20, such that the transmission of stresses between the satellites 1 passes predominantly, or even exclusively, by the posts 12. The stacked satellites 1 are placed in the launcher which conventionally comprises a spacecraft interface structure 21. The spacecraft interface structure 21 should itself be known by the skilled person allowing an interface between a satellite and a launcher, and to secure them together. Optionally, depending on the launcher, the spacecraft interface structure 21 can be decomposed into two parts: a lower cone 21a directly attached to the launcher and corresponding to conventional launcher interfaces, and an adapter 21b located between the lower cone 21a and the stack of satellites 1. The adapter 21b transforms the distribution of stresses provided by the stack of satellites 1 into a stress distribution consistent with the specifications of the selected launcher and its standard lower cone 21a. The adapter 21b is considered as being provided with the stack of satellites 1.

Figure 9:
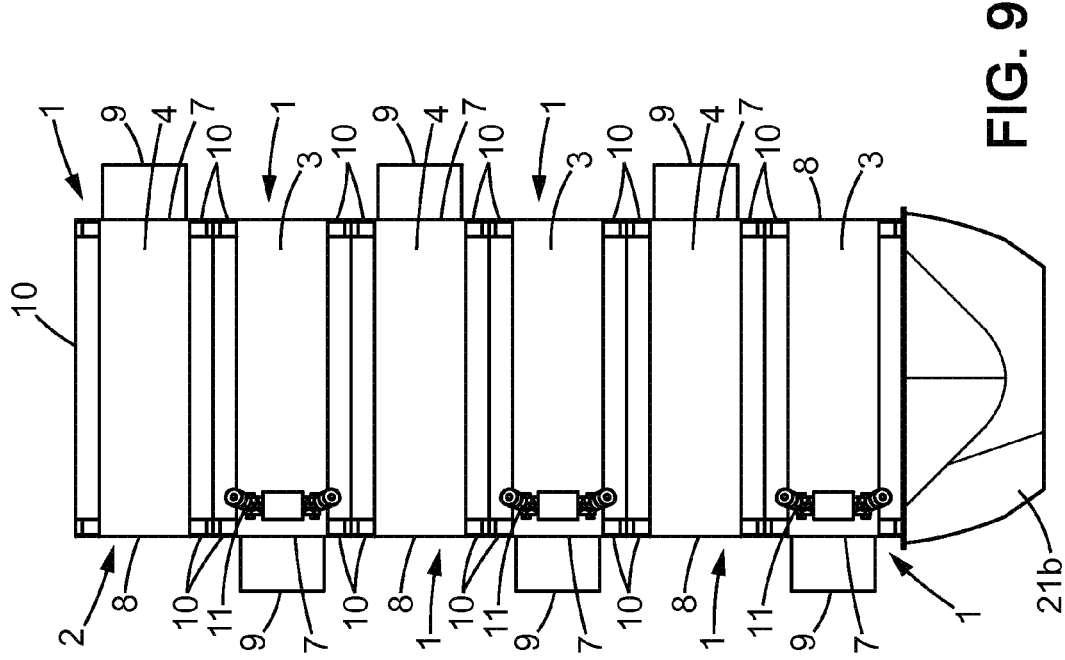
Figure 8:
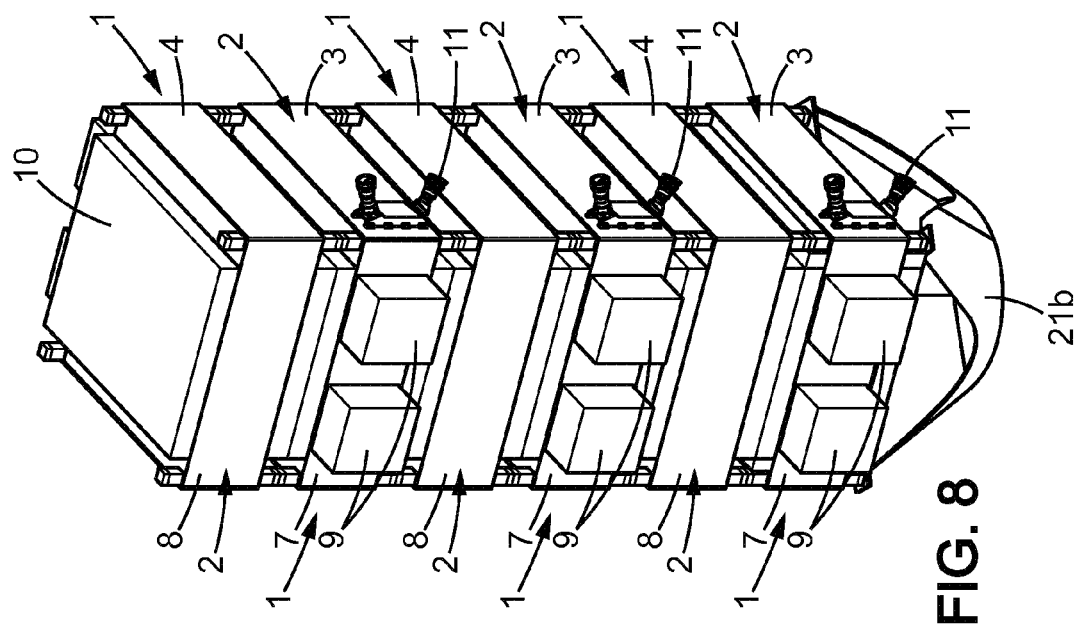
Figure 11:
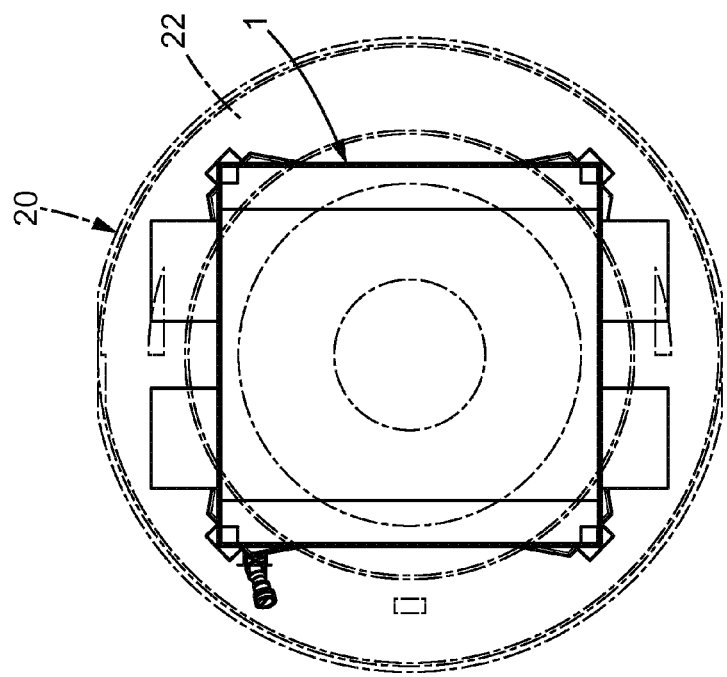
Figure 10:
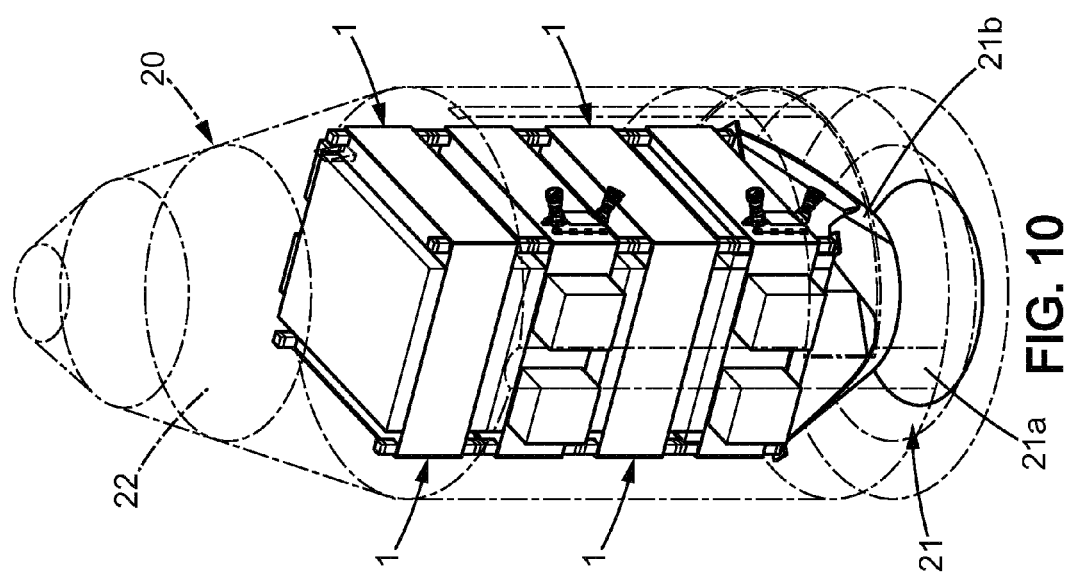

FIGS. 8 and 9 illustrate an example of a stack of six satellites 1 on the spacecraft interface structure 21 using a lower cone 21a and an adapter 21b. The posts 12 of the satellites are all oriented according to the same longitudinal direction A from the interface structure 21, such that the distal end 13 of the posts 12 of a first satellite 1 is facing the proximal end 14 of the posts 12 of a second satellite, the distal end 13 of the posts 12 of the second satellite 1 facing the proximal end 14 of the posts 12 of a third satellite and so on until the sixth and final satellite 1. In other words, the North face 5 of a satellite 1 faces the South face 6 of the adjacent satellite 1 in the stack according to the example presented here.

Preferably, the longitudinal dimension of the posts 12 is such that the solar panels 10 of two adjacent satellites 1 are not in contact. In general, two adjacent satellites 1 of a stack are in contact only via their posts 12.

The releasable locking devices 15 are all preferably identical, facilitating the manufacture and management of the satellites 1.

The posts 12 allow stacking the satellites in order to optimize the space under the fairing in a launcher, in particular by stacking the satellites with alternating satellite 1 orientation such that the equipment of two adjacent satellites do not interfere. For example, the satellites 1 of a stack may all have their Earth and anti-Earth faces 7, 8 oriented in a transverse direction as shown, or along a longitudinal direction. The orientation around the longitudinal direction may also be alternating between the stacked satellites 1: for example, as shown in FIGS. 8 and 9 respectively, the West face 3 and the Earth face 7 of a satellite 1 may be oriented opposite the West face 3 and the Earth face 7 of the adjacent satellite 1 respectively, such that the antennas 9 of the two adjacent satellites 1 do not interfere mutually. More generally, the orientation of the satellites 1 stacked on the launcher is directly dependent on the space requirement on the different faces 3-8 of the body 2.

In order to place the satellites 1 in a launcher 20 provided with an interface 21 of the spacecraft structure, the satellite 1 stack is first formed as described above. The proximal end 14 of each post 12 of the first satellite 1 is then placed facing the interface structure 21 under the fairing 22 of the launcher 20. The interface 21 structure is then adapted to cooperate with the releasable locking devices 15 of the first satellite 1. As for the other satellites 1, the first satellite 1 of the stack, attached to the interface structure 21, is in contact with the structure 21 preferably only through its posts 12. Optionally, the first satellite 1 of the stack can comprise an adapter 21b already coupled with the proximal end 14 of each of its posts 12 and will then be coupled with a lower cone 21a which is already installed in the launcher. Alternatively, the satellites 1 may be installed one by one in the launcher 20. No intermediate structure is required between the fairing 22 of the launcher 20 and the satellites 1. As a result, there is a gain in space and weight. In addition, it is possible to adapt the number of satellites depending on the capacity of the launcher 20.

The number of stacked satellites 1 does not influence the design of the posts 12 and the reinforcing structure 16 of the satellites. Indeed, in order to stack the satellites, it is understood that only a requirement related to the arrangement of the posts 12 is required to allow cooperating the ends 13, 14 of the posts 12 of two satellites 1. Thus, it is possible to produce identical satellites 1, in series. It is also possible to dimension the posts 12, the legs 17, and the shear consolidating members 19 depending on the position of the satellite 1 in the stack. Indeed, the first satellite 1, closest to the spacecraft interface structure 21, is usually the one accommodating the most stress because of the weight of all the other stacked satellites 1. Thus, the posts 12 and the reinforcing structure 16 of the first satellite can be oversized relative to the other satellites 1 of the stack. Similarly, for the last satellite 1 of the stack, the posts 12 and the reinforcing structure 16 may be undersized.

Figure 12:
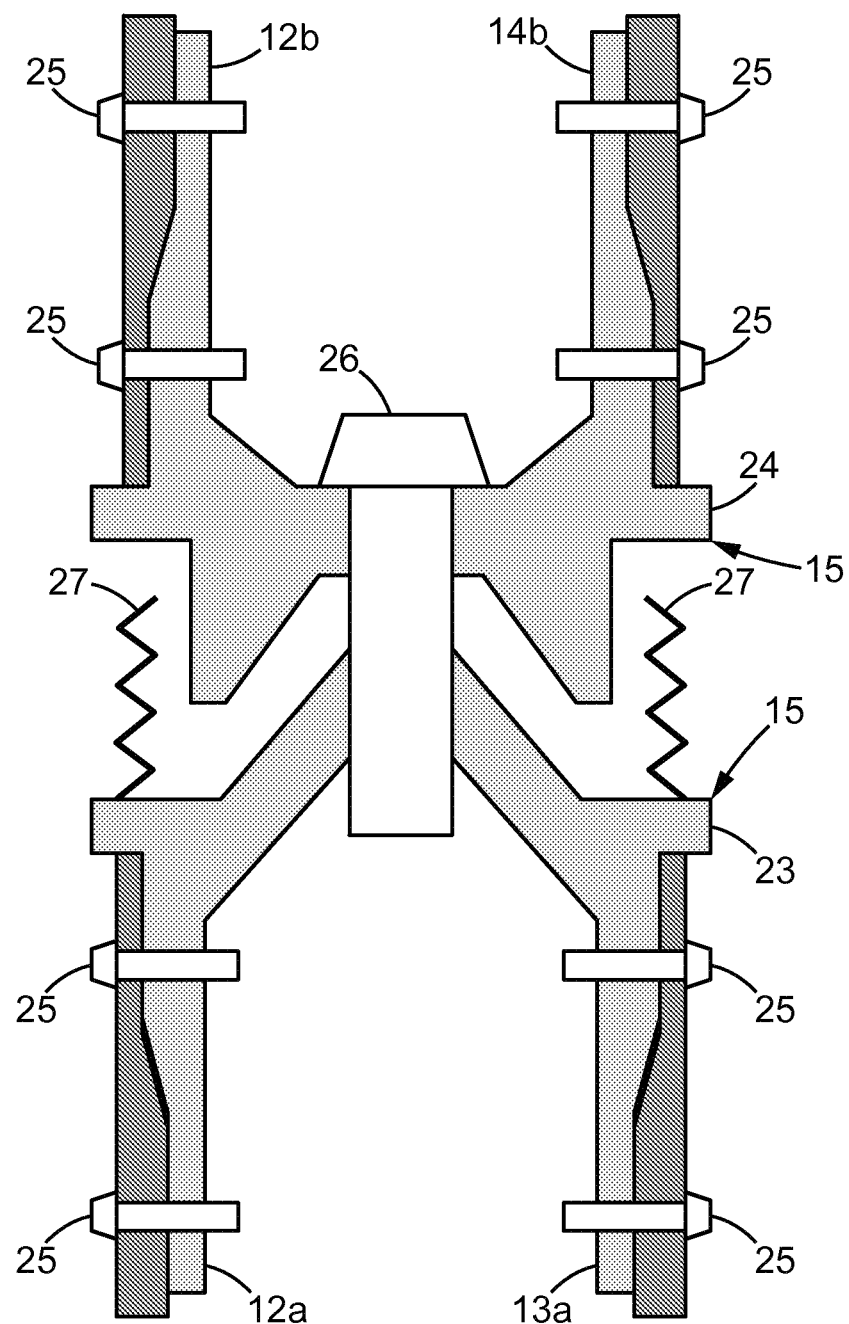

FIG. 12 shows an embodiment of releasable locking devices 15 between the distal end 13a of a post 12a of a first satellite and the proximal end 14b of a post 12b of a second satellite. According to this example, the releasable locking devices 15 are unilateral, i.e. a single passage from the locked state to the unlocked state is provided, and a return to the locked state is not provided. The costs of the releasable locking devices 15 are thus low. However, it is not excluded that there exists another alternative embodiment in which the releasable locking devices 15 can be locked again after unlocking, to allow test phases on the ground for these devices.

In this example, the posts 12a, 12b are hollow, at least from their ends.

The releasable locking device 15 on the post 12a of the first satellite comprises a male piece 23 inserted into the distal end 13a of the post 12a and rigidly attached therein for example by screws 25. The releasable locking device 15 on the post 12b of the second satellite is additional to that of the first satellite, and comprises a female piece 24 inserted into the proximal end 14b of the post 12b and which is likewise rigidly attached therein by screws 25. To switch releasable locking devices 15 into the locked state, the male piece 23 is inserted into the female piece 24, and locking means 26, screws for example, connect the two pieces 23, 24. Preferably, a clearance is provided between the two pieces 23, 24, to allow a longitudinal displacement between the two posts 12a, 12b. Damping means 27, schematically shown with springs in FIG. 12, may be mounted on the male piece 23, such that when the post 12b of the second satellite approaches the post 12a of the first satellite, for example as a result of impacts and/or vibrations the contact between the two posts 12a, 12b is damped. The locking means 26 are coupled to unlocking means, which are not shown in FIG. 12. These unlocking means allow removing the connection between the male piece 23 and the female piece 24, such that the locking devices 15 are in the unlocked state. These may for example be pyrotechnic means for removing the screw-type locking means 26. Alternatively, the locking means 26 comprise a magnetic member, such as an electromagnet: supplying a current makes it possible to connect the two pieces 23, 24, putting the locking devices 15 into the locked state. It is then sufficient to cut the power supply to put the locking devices 15 into the unlocked state. Alternatively, the locking means 26 may be located around the ends of each post.

During the satellite drop phase, the damping means 27 also facilitate the separation of two previously stacked satellites, allowing their respective spacing apart following the switch of the locking means 26 into the unlocked state.

Figure 15:
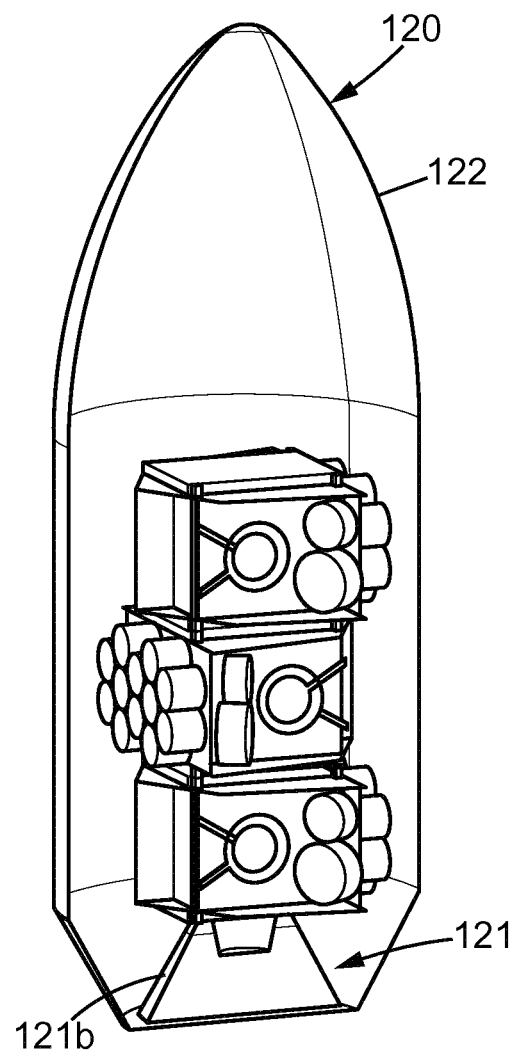

A second example of a satellite 100 is shown in FIGS. 13 to 15.

The satellite 100 according to the second example also includes a body 102 having four faces referred to as North face 105, South face 106, East face 107, West face 108, with reference to the terrestrial cardinal points, and two faces referred to as Earth face 104 and anti-Earth face 103, with reference to the orientation of these faces relative to the Earth. Equipment, such as antennas 109, solar panels 110 shown folded on the North and South faces 105, 106, are assembled on the body 102. Antennas 111 may also be provided on the Earth face 104. It is for example a telecommunications satellite.

The satellite 100 also comprises posts 112. According to this second example, the posts 112 are placed at the outer periphery of the satellite 100 body 102, and extend as previously in the same longitudinal direction A, perpendicular to the North and South faces 105, 106. More specifically, according to this second example, two posts 112 are arranged against the Earth face 104 and two other posts are arranged against the anti-Earth face 103.

The arrangement of the posts 112 is a compromise between the space requirement around the satellite 100 body 102 and the mechanical strength requirements for the stack of satellites 100.

Indeed, in the same manner as outlined previously, the posts 112 are each provided with at least one, in practice two, each arranged on one end 13, 14 of a post 12, releasable locking devices 115 to allow assembling the satellites 100 together and optionally with a satellite interface structure 121 in a launcher 120. In the same manner as outlined previously, the satellite interface structure 121 may comprise two members which are not shown, namely a lower cone on the launcher side and an adapter on the satellite side. The releasable locking devices 115 are substantially identical to those already described. The reinforcing structure 116 is substantially identical to that of the first example, and includes legs 117 in the form of a lattice connecting the posts 112 together through the geometric center C of the satellite body 102. The walls holding the North 105, South 106, Earth 104, and anti-Earth 103 faces may either replace the legs 117 and form by themselves the reinforcing structure 116 or participate in the shear resistance of the posts 112 as shear consolidating members.

The stack of satellites 100 according to the second example is substantially identical to the stacks already described with reference to the first embodiment. Thus, stacked satellites 100 face each other from their North and South faces 105, 106, and may be oriented differently from each other around the longitudinal direction depending on the space requirement and the available space under the fairing 122 of the launcher 120.

Figure 16:
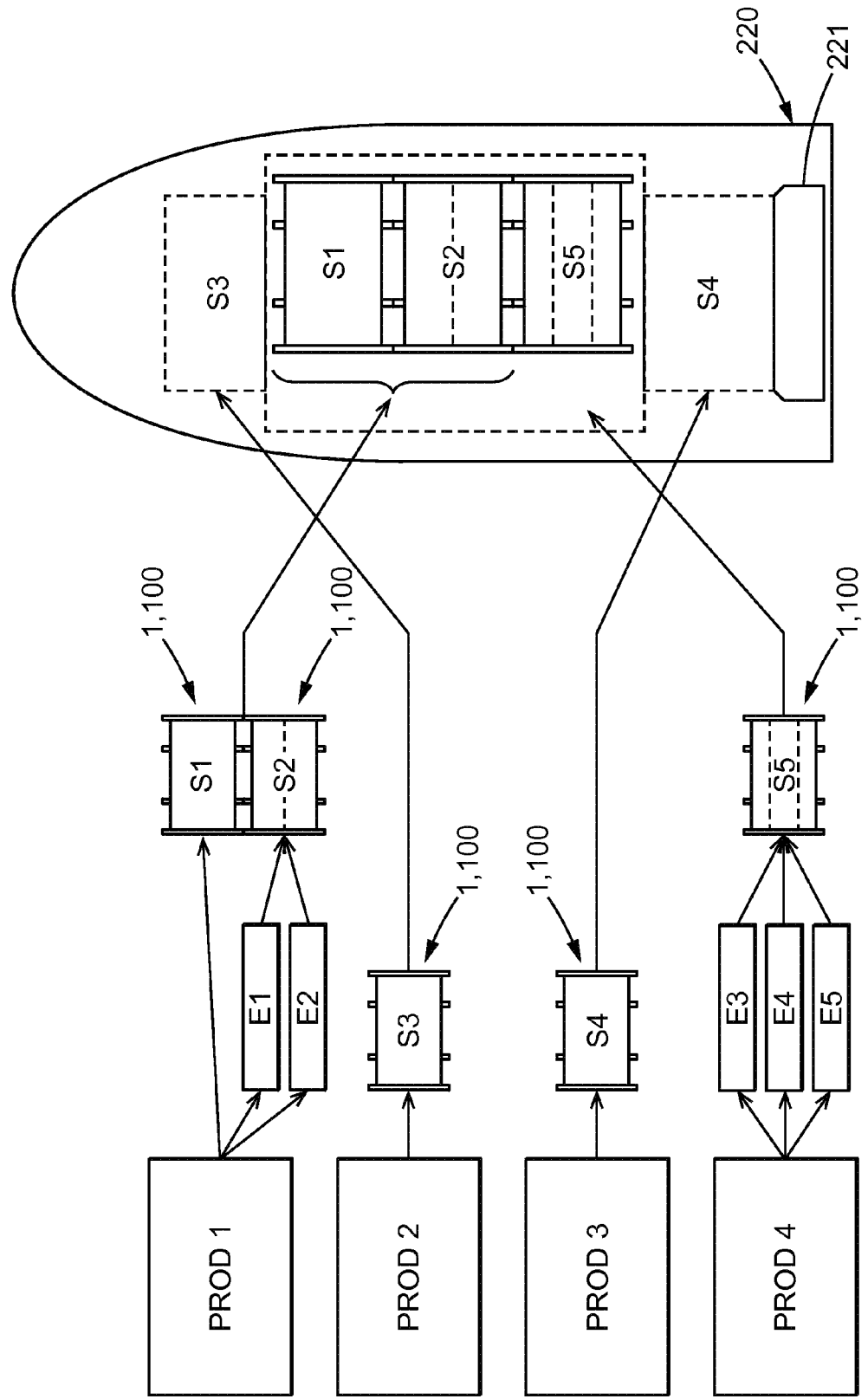
FIG. 16 is a diagram illustrating an example of a method for stacking satellites in a launcher.

The satellite 1, 100 in the description provides the possibility of making heterogeneous stacks, i.e, with more than one type of satellite. Thus, for a single stack to be placed in a launcher 220, it is possible to consider several satellites 1, 100, five in the case of the present example according to FIG. 16 named S1, S2, S3, S4, S5, from several production sites, named PROD1, PROD2, PROD3 and PROD4, different from each other, and to form the stack once on the launch site. For example, satellite S1 and satellite S2 are from the same production site PROD1. Satellite S2 is itself formed by assembling members E1 and E2, which may be intended to be dropped later and separately in space. The production site PROD1 then provides a group comprising satellite S1 stacked on satellite S2, the locking devices 15, 115 between the two satellites S1 and S2 then being in the locked state. Satellite S3 comes from the production site PROD2, satellite S4 comes from the production site PROD3, and satellite S5 consists of three members E3, E4, E5 from the production site PROD4. On the launch site, there is therefore the group comprising satellites S1 and S2, satellite S3, satellite S4, and satellite S5. The posts 12, 112 of the five satellites S1 to S5 may be different, but they are arranged in order to allow stacking.

Satellite S4 is first locked on the satellite interface structure 221 of the launcher 220. Optionally, satellite S4 can be previously coupled with an adapter which will then be coupled, in the launcher, with a lower cone already installed in the launcher. Then, a new group is formed outside the launcher 220, by locking satellite S5 under the group consisting of satellites S1 and S2. The new satellite group S5, S2, S1 is then stacked on satellite S4, in the launcher 220, putting into the locked state the locking devices 15 between satellite S4 and satellite S5. Finally, satellite S3 is locked on satellite S1 of the new satellite group S5, S2, S1. The control device for the state of the locking devices can either be aboard the launcher or comprise several modules each aboard one of satellites S1 to S5 or a satellite from a group. The command can be programmed in the control device or be emitted from the ground. Satellites S3 and S4 do not necessarily have a structure according to the invention comprising posts, nevertheless they have compatible locking/unlocking means as well as the ability to accommodate the stresses exerted during the launch by the stack of satellites with which they are interconnected.

The stacking and assembling sequence in the launcher 220 may be adjusted according to what is provided by the production sites and the order in which the satellites S1 to S5 are to be dropped in space.

Once the launcher 220 is in space, satellites S1 to S5 can be dropped through the control device for the state of the locking devices. For example, satellite S3 is dropped first by putting into the unlocked state the locking devices 15 between satellite S3 and satellite S1. Then, the group of satellites S5, S2, S1 may all be dropped, putting into the unlocked state the locking devices 15 between satellite S4 and satellite S5. Satellites S5, S2, S1 can then be separated from each other once dropped in space. Finally, satellite S4 is separated from the satellite interface structure 221. The control device for the state of the locking devices can program the satellite drop sequence in advance.

The drop sequence should not take account of potential balance issues within the launcher.

The spacecraft according to the invention is suitable for any type of space mission (telecommunications, navigation, earth observation spacecraft, science, space exploration), regardless of their orbit (LEO, GEO, MEO, HEO).

Moreover, single equipment may also be dropped in space due to this structure. Satellites for a constellation may also be dropped in groups (e.g. depending on their orbital plane) or one by one.

The spacecraft according to the invention is well adapted for a satellite weight of typically 1 ton or more, but could also be applied, without loss of generality, to smaller satellites of a few kilograms, allowing for one or several stacks located "side by side" under the launcher fairing.

The invention claimed is:

1. A spacecraft (1, 100) intended to be put into orbit around a planet, the spacecraft (1, 100) comprising:
    at least one equipment carrying module (2, 102), for supporting the spacecraft (1, 100) equipment;
    at least three posts (12, 112) extending at least partially in a same longitudinal direction (A) and at the periphery of the equipment carrying module (2, 102), each post (12, 112) being provided with at least one releasable locking device (15, 115) which may have two states:
        a locked state, wherein the locking device (15, 115) is attached to an additional locking device (15, 115),
        an unlocked state, wherein the locking device (15, 115) is released from any other locking device (15, 115);
    a reinforcing structure (16, 116) which rigidly connects each post (12, 112) transversely to at least two other posts (12, 112).

2. The spacecraft (1, 100) according to claim 1, wherein there are three posts (12, 112) and they are distributed on the vertices of an equilateral triangle.

3. The spacecraft (1, 100) according to claim 1, wherein there are four posts (12, 112) and they are distributed on the vertices of a parallelogram.

4. The spacecraft (1, 100) according to claim 1, wherein each releasable locking device (15, 115) comprises a magnetic member.

5. The spacecraft (1, 100) according to claim 1, wherein each releasable locking device (15, 115) comprises a pyrotechnic member.

6. The spacecraft (1, 100) according to claim 1, wherein each post extends longitudinally between two ends (13, 14), each end (13, 14) being provided with a locking device (15, 115).

7. Method of assembling at least two spacecrafts (1, 100) according to claim 1, comprising the steps of:
    positioning the at least two spacecrafts (1, 100) such that the posts (12, 112) of a first spacecraft (1, 100) extend at least partially in a same longitudinal direction as the posts (12, 112) of the second spacecraft (1, 100);
    cooperating each locking device (15, 115) of the first spacecraft (1, 100) with a locking device (15, 115) of the second spacecraft (1, 100);
    switching to the locked state of the locking devices (15, 115) of the first spacecraft (1, 100) on the locking devices (15, 115) of the second spacecraft (1, 100).

8. The spacecraft (1, 100) according to claim 1, wherein the reinforcing structure (16, 116) comprises reinforcing members in the form of legs (17, 117), the number of which corresponds to at least the number of posts (12, 112), each leg (17, 117) being attached between two posts (12, 112).

9. The spacecraft (1, 100) according to claim 8, wherein the reinforcing legs (17, 117) are connected in pairs by shear consolidating members (19).

10. The spacecraft (1, 100) according to claim 8, wherein the legs (17, 117) are combined with the equipment carrying module (2, 102) walls, the walls forming a support for the spacecraft. (1, 100) equipment.

11. The spacecraft (1, 100) according to claim 10, wherein the reinforcing legs (17, 117) are connected in pairs by shear consolidating member (19).

12. The spacecraft (1, 100) according to claim 1, wherein the reinforcing structure (16, 116) comprises reinforcing members in the form of legs (17, 117), the number of which corresponds to at least the number of posts (12, 112), each leg (17, 117) being attached to one of the posts (12, 112) and to a single attachment center (C).

13. The spacecraft (1, 100) according to claim 12, wherein the reinforcing legs (17, 117) are connected in pairs by shear consolidating members (19).

14. The spacecraft (1, 100) according to claim 1, wherein each post (12, 112) is provided with two releasable locking devices (15, 115).

15. Stack of spacecraft (1, 100) according to claim 14, comprising at least two spacecrafts (1, 100) secured together, the at least one releasable locking device (15, 115) of each post (12, 112) of a first spacecraft (1, 100) being in locked position with a locking device (15, 115) on a post (12, 112) of the second spacecraft (1, 100), the posts (12, 112) for each spacecraft extending in a same longitudinal direction (A), the stack further comprising a device for controlling the state of the locking devices (15, 115).

16. Stack of spacecrafts (1, 100) according to claim 15, wherein the spacecrafts (1, 100) are satellites comprising an Earth face (7, 104) and an anti-Earth face (8, 103), the Earth and anti-Earth faces being oriented in the longitudinal direction (A) of the posts (12, 112).

17. Stack of spacecrafts (1, 100) according to claim 15, wherein the spacecrafts (1, 100) are satellites comprising an Earth face (7, 104) and an anti-Earth face (8, 103), the Earth (7, 104) and anti-Earth (8, 103) faces being oriented in a direction transverse to the posts (12, 112).

18. Spacecraft (1, 100) launcher (20, 120, 220), the launcher comprising a spacecraft interface structure (21, 121, 221) and at least one first stack of spacecrafts (1, 100) according claim 15, a first locking device (15, 115) for each post (12, 112) of the first spacecraft (1, 100) being in the locked state on a locking device (15, 115) of the second spacecraft (1, 100), the second locking device (15, 115) of each post (12, 112) of the first spacecraft (1, 100) being in the locked. state on the spacecraft interface structure (21, 121, 221).

19. Method for dropping spacecrafts (1, 100) by means of a launcher (21, 121, 221) according to claim 18, comprising a step of separation between. a spacecraft (1, 100) to be dropped and a spacecraft (1, 100) intended to remain in the launcher by putting into the unlocked state the locking devices (15, 115) between the two spacecrafts (1, 100) so as to release a single spacecraft (1, 100).

20. Method for dropping spacecrafts (1, 100) by means of a launcher (21, 121, 221) according to claim 18, comprising a step of separation between a group of spacecrafts (1, 100) to be dropped and one spacecraft (1, 100) intended to remain in the launcher by putting into the unlocked state the locking devices (15, 115) between a spacecraft (1, 100) from the group to be dropped and the spacecraft (1, 100) intended to remain in the launcher (20, 120, 220), in order to drop the group of spacecrafts (1, 100).

* * * * *